(12) United States Patent
Sato et al.

(10) Patent No.: US 11,584,508 B2
(45) Date of Patent: Feb. 21, 2023

(54) ROTATING DEVICE AND AIRCRAFT

(71) Applicant: SUBARU CORPORATION, Tokyo (JP)

(72) Inventors: Kazushige Sato, Tokyo (JP); Kentaro Yoshida, Tokyo (JP); Kazuaki Kotani, Tokyo (JP); Iwao Murata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 170 days.

(21) Appl. No.: 16/784,575

(22) Filed: Feb. 7, 2020

(65) Prior Publication Data

US 2020/0290726 A1 Sep. 17, 2020

(30) Foreign Application Priority Data

Mar. 11, 2019 (JP) ................................ JP2019-44099

(51) Int. Cl.
*B64C 11/00* (2006.01)
*F04D 29/18* (2006.01)

(52) U.S. Cl.
CPC .......... *B64C 11/001* (2013.01); *F04D 29/186* (2013.01)

(58) Field of Classification Search
CPC ... F04D 29/326; F04D 29/186; B64C 11/001; B63H 2001/165
See application file for complete search history.

(56) References Cited

U.S. PATENT DOCUMENTS

| 1,645,612 A * | 10/1927 | Miller ................... B64C 11/001 |
| | | 244/73 R |
| 4,787,573 A | 11/1988 | Panchard |
| 5,181,686 A * | 1/1993 | Barthel .................. F26B 25/18 |
| | | 248/173 |
| 8,979,016 B2 | 3/2015 | Hayden, III |
| 9,555,879 B1 | 1/2017 | Kaiser |
| 2012/0175179 A1 | 7/2012 | Spector et al. |
| 2015/0093956 A1 | 4/2015 | Mielniczek |
| 2016/0169193 A1 | 6/2016 | Takashahi et al. |
| 2019/0118961 A1* | 4/2019 | Woodruff ............... B64C 27/12 |

FOREIGN PATENT DOCUMENTS

| CN | 108361124 A | 8/2018 |
| GB | 2 423 509 A | 8/2006 |
| JP | 59-19747 A | 2/1984 |
| JP | 4-22386 A | 1/1992 |

(Continued)

OTHER PUBLICATIONS

Extended European Search Report issued in corresponding European Patent Application No. 20 15 6115 dated Aug. 7, 2020.
(Continued)

*Primary Examiner* — Richard A Edgar
(74) *Attorney, Agent, or Firm* — Troutman Pepper Hamilton Sanders LLP

(57) ABSTRACT

According to one implementation, a rotating device includes at least one ring, at least one motor and a power transmission mechanism. The least one ring rotates in a circumference direction. The at least one ring includes no hub for housing a motor inside the at least one ring. The at least one motor generates power for rotating the at least one ring. The power transmission mechanism transmits the power to the at least one ring.

12 Claims, 9 Drawing Sheets

(56) References Cited

FOREIGN PATENT DOCUMENTS

| JP | 9-151895 A | 6/1997 |
| JP | 2003-28241 A | 1/2003 |
| JP | 2008-121547 A | 5/2008 |
| JP | 2015-501751 A | 1/2015 |
| JP | WO 2015/105202 A1 | 7/2015 |
| JP | 2016-109164 A | 6/2016 |
| WO | 2013/074545 A1 | 5/2013 |
| WO | 2013/182708 A1 | 12/2013 |
| WO | 2015/038567 A1 | 3/2015 |

OTHER PUBLICATIONS

Dengel, B., "A primer on backlash, its purpose in gear designs" 3 pages, retrieved Jul. 16, 2020 https://gearsolutions.com/departments/tooth-tips/a-primer-on-backlash-its-purpose-in-gear-designs/.

Notice of Reasons for Refusal issued in Japanese Patent Application No. 2019-044099 dated Dec. 20, 2022, with English machine translation.

\* cited by examiner

A-A

ROTATING DEVICE AND AIRCRAFT

CROSS REFERENCES TO RELATED APPLICATIONS

This application is based upon and claims the benefit of priority from Japanese Patent Application No. 2019-44099, filed on Mar. 11, 2019; the entire contents of which are incorporated herein by reference.

FIELD

Implementations described herein relate generally to a rotating device and an aircraft.

BACKGROUND

Conventionally, a fan is used as a rotating device having the power for air blow or obtaining thrust (for example, refer to Japanese Patent Application Publication JP2015-501751 A). A typical fan has a structure in which a casing called a hub is disposed at a center and blades are coupled to the circumference of the hub. The hub houses a motor, such as an electric motor, inside.

However, a hub is always exposed to a flow of fluid induced by rotation of blades. Moreover, a path of the fluid is narrowed due to arrangement of a hub. Therefore, a hub causes the increase in a fluid resistance and a pressure loss. As a result, a hub is a deterioration factor in transfer efficiency of fluid. For example, when a fan is intended for air blow, a hub is a deterioration factor in the generation efficiency of a wind. Meanwhile, when a fan is a ducted fan of an aircraft for obtaining thrust, a hub is a deterioration factor in the generation efficiency of the thrust.

On the other hand, a rotor for an aircraft having a structure in which a hub is not disposed has been also proposed. As an example, a floating mechanism, composed of two rotating rings disposed one above the other and blades radially attached to the outer surfaces of the rotating rings, which generates lift by rotating the two rotating rings reversely to each other, has been proposed for a V/STOL (vertical and/or short take-off and landing) aircraft (for example, refer to Japanese Patent Application Publication JP2015-501751 A). This floating mechanism can rotate the two rotating rings by three motors disposed on spokes fixed to the inside of the rotating rings.

As for a rotating device having the power, such as a fan, it is preferable not to dispose any structural object, which may obstruct a flow of fluid, as well as a hub around a rotation center in order to achieve the purpose of the rotating device more efficiently. For example, when a fan is intended for air blow, it leads to improvement in air blow efficiency to dispose no structural objects other than blades around a rotation center. Meanwhile, when a fan is a ducted fan of an aircraft, it leads to improvement in thrust to dispose no structural objects other than blades around a rotation center.

Accordingly, an object of the present invention is to reduce parts which should be disposed near a rotation center of a rotating device, such as a fan, which rotates by power, as much as possible.

SUMMARY OF THE INVENTION

In general, according to one implementation, a rotating device includes at least one ring, at least one motor and a power transmission mechanism. The least one ring rotates in a circumference direction. The at least one ring includes no hub for housing a motor inside the at least one ring. The at least one motor generates power for rotating the at least one ring. The power transmission mechanism transmits the power to the at least one ring.

Further, according to one implementation, an aircraft includes the above-mentioned rotating device.

DETAILED DESCRIPTION

A rotating device and an aircraft according to implementations of the present invention will be described with reference to the accompanying drawings.

(First Implementation)
(Structure and Function)

Figure 1:
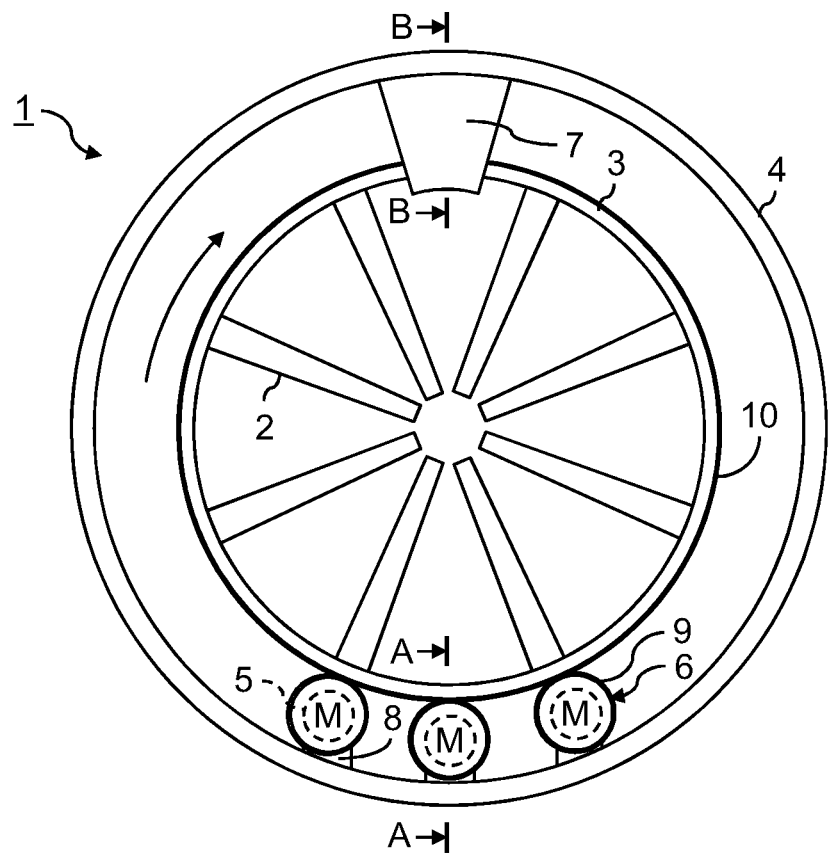
FIG. 1 is a front view showing a structure of a rotating device according to the first implementation of the present invention.
Figure 2:
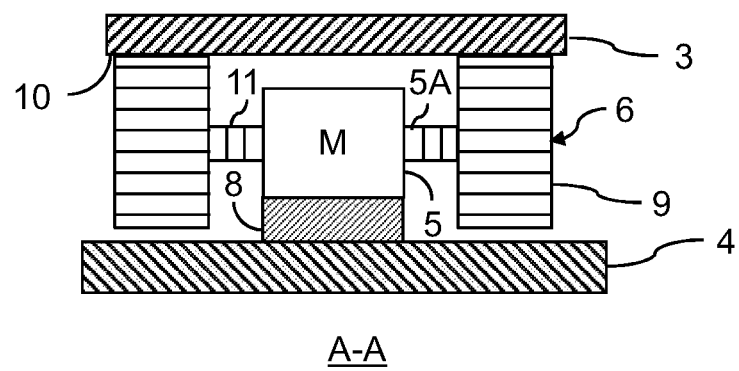
FIG. 2 is a partial expanded sectional view at the position A-A of the rotating device shown in FIG. 1.

FIG. 1 is a front view showing a structure of a rotating device according to the first implementation of the present invention, and FIG. 2 is a partial expanded sectional view at the position A-A of the rotating device shown in FIG. 1.

A rotating device 1 is a device, such as a fan or a rotor, having blades 2 and rotating by power for forming a flow of fluid. The rotating device 1 can be used for various intended purposes as exemplified below. Therefore, the rotating device 1 can be called by various names according to intended purposes.

In general, a rotating device included in a watercraft or the like in order to obtain thrust under water is called a screw or a propeller. Meanwhile, a rotating device included in an aircraft in order to obtain thrust or lift by forming a flow of air is called a fan, a rotor or a propeller. In particular, a fan housed with a cylindrical duct is called a ducted fan.

For example, a ducted fan is suspended on a main wing or the like of a fixed wing aircraft in order to obtain thrust or the like. Alternatively, a propeller for obtaining thrust or the like is attached to a leading edge of main wing of a fixed wing aircraft or an airship. Moreover, a fan provided in a fuselage, a main wing or the like of a fixed wing aircraft in order to obtain lift is called a lift fan. A typical lift fan consists of a ducted fan.

Meanwhile, a rotating device included in a rotorcraft, such as a helicopter, is called a rotor or a propeller in many cases. A typical helicopter has at least one main rotor for obtaining lift and a tail rotor for adjusting thrust. A ducted fan may be used as a tail rotor.

On the other hand, a rotating device for ventilation, such as an electric fan or a ventilation fan, is called a fan in many cases. Meanwhile, various fans, such as a turbofan and a cooling fan, are also included in an automobile. A fan is also included in not only a moving vehicle, such as an automobile, but a turbine, an engine, and the like. Moreover, a turbine itself and a compressor are also one kind of a rotating device.

Hereinafter, an example of a case where the rotating device 1 is a fan, a rotor or a propeller for an aircraft for obtaining thrust or lift will be described mainly.

The rotating device 1 includes blades 2 but does not include a hub in which a motor is placed. Moreover, spokes for securing the strength are not required necessarily. That is, the rotating device 1 has a hubless structure which has no rotating shaft for transmitting torque to the blades 2 placed radially and is hollow near the rotation center axis.

Note that, a hub is a part or a component part, placed near a rotating axis of a typical circular or radiate rotating device. Meanwhile, a spoke is a rod member whose length direction is a radial direction of a typical circular rotating device, radially placed in order to couple a circular rim, placed as a structure member at the circumference portion of the rotating device, to a hub placed at the rotating center.

The rotating device 1 can be composed of the blades 2, a rotating ring 3, a fixed ring 4, motors 5, power transmission mechanisms 6 and a guide mechanism 7 as shown in FIG. 1.

Each one end of the blades 2 for forming a flow of fluid, such as air, by rotating around a virtual rotating axis is fixed to the inner surface of the rotating ring 3. Thereby, the blades 2 are placed radially in a space formed inside the rotating ring 3.

The rotating ring 3 is a ring which can rotate in the circumference direction without a hub for placing a motor inside and spokes for securing strength. Therefore, the rotating ring 3 functions as a rim which transmits torque to the radially placed blades 2 from the outer circumference side. A rim is an annular structural member for securing strength.

Note that, the tips of the blades 2 may be overlapped, contacted or coupled to each other, without forming a gap between the tips. When the tips of the blades 2 are not contacted but overlapped with each other, what is necessary is to twist the tips of the blades 2. Meanwhile, even when the tips of the blades 2 are contacted or coupled to each other, each blade 2 is used only to form a flow of fluid and is not used to secure the strength of the rotating ring 3 although each blade 2 has a structure like a spoke.

Figure 3:
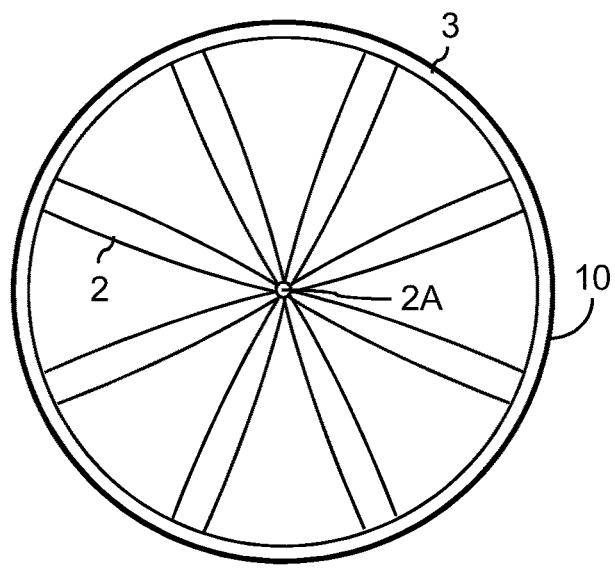
FIG. 3 shows an example of coupling the blades shown in FIG. 1 to each other.

FIG. 3 shows an example of coupling the blades 2 shown in FIG. 1 to each other.

The tips of the blades 2 may be coupled to each other with a shaft 2A as exemplified in FIG. 3. The shaft 2A which couples the tips of the blade 2 to each other is a mere coupler which does not transfer torque to each blade 2.

The fixed ring 4 is an annular casing which houses the rotating ring 3 inside which the blades 2 are attached radially. When the cross sectional shape of the rotating device 1 need not be circular, the casing may also have a desired cross section shape, such as a rectangular shape, as well as an annular shape.

The motors 5 are power sources which generate the power for rotating the rotating ring 3. The motors 5 must have power according to the weight of the rotating ring 3 to which the blades 2 have been attached radially. For example, when the weight of the rotating ring 3 to which the blades 2 have been attached radially is large like when the blade 2 is large-sized and made of a metal or a fiber-reinforced plastic, sufficient output power is required for the motors 5. Conversely, when the weight of the rotating ring 3 to which the blades 2 have been attached radially is very small like when the blade 2 is small-sized and made of a plastic, the output power required for the motors 5 is small.

Therefore, each motor 5 may be not only an electric motor but a hydraulic motor, a pneumatic motor or a water pressure motor, according to power required for rotating the rotating ring 3 and a usage environment of the rotating device 1.

Each motor 5 is placed outside the area, including a rotation center, segmented by the rotating ring 3, i.e., outside the area in which the blades 2 are placed radially. This is because the space, including the central axis of the rotating ring 3, separated by the rotating ring 3 is a path of fluid, such as air, and the motor 5 becomes an obstacle of the fluid if the motor 5 is placed.

For that reason, the motors 5 can be placed in an annular space formed between the rotating ring 3 and the fixed ring 4 which has a larger diameter than that of the rotating ring 3 as exemplified in FIG. 1 and FIG. 2. For example, each motor 5 can be fixed inside the fixed ring 4 by a support member 8 made of a metal block or the like.

In the example shown in FIG. 1, the three motors 5 have been placed outside the rotating ring 3 and inside the fixed ring 4. Note that, the number of the motors 5 may be one. That is, at least one motor 5 is included in the rotating device 1.

When the power for rotating the one common rotating ring 3 is generated by the motors 5, it becomes possible to continue rotation of the rotating ring 3 by transmitting the power from at least any one of the motors 5 to the rotating ring 3 even when trouble that the power from one motor 5 is not transmitted to the rotating ring 3 occurs. That is, redundancy can be given to the rotating device 1 by rotating the common rotating ring 3 and blades 2 by the motors 5.

Each power transmission mechanism 6 transmits the power from the motor 5 to the rotating ring 3. More specifically, each power transmission mechanism 6 transmits rotational movement from the output shaft 5A of the motor 5 to the rotating ring 3 by transmitting torque output from the output shaft 5A of the motor 5 to the rotating ring 3.

It is practical to compose each power transmission mechanism 6 of at least one gear 9 which transmits the torque output from the output shaft 5A of the motor 5 to the rotating ring 3, from a viewpoint of simplification in structure and obtaining sufficient torque. Therefore, teeth engaged with the gear 9 or the gears 9 are formed also on the outer surface of the rotating ring 3. That is, the rotating ring 3 itself can consist of a ring-shaped gear 10 while the power transmission mechanism 6 can be composed of the gear 9 or the gears 9 engaged with the ring-shaped gear 10. Thereby, the torque output from the output shaft 5A of the motor 5 can be transmitted from the gear 9 or the gears 9, composing the power transmission mechanism 6, to the gear 10 composing the rotating ring 3.

When the power and torque output from the output shaft 5A of the motor 5 are transmitted to the outer surface of the rotating ring 3 as exemplified in FIG. 1 and FIG. 2, the rotating ring 3 consists of a ring-shaped external gear. Therefore, each gear 9 included in the power transmission mechanism 6 can consist of a disk-shaped or cylindrical spur gear.

In order to secure redundancy by generating the power for rotating the common rotating ring 3 with the motors 5, it is appropriate to transmit the pieces of power, generated by the motors 5, separately to the common rotating ring 3 by the power transmission mechanisms 6 respectively. Therefore, it is appropriate to couple the output shafts 5A of the motors 5 to the separate gears 9 respectively.

When the power is transmitted by at least one gear 9, it leads to improvement in reliability and safety to prevent jamming. Jamming is failure by which the gear 9 does not move mechanically. For example, the risk that jamming could arise can be reduced by forming backlash between each gear 9 for transmitting torque to the rotating ring 3 and the ring-shaped gear 10 composing the rotating ring 3. That is, the risk that jamming could arise can be reduced by intentionally forming gaps between external teeth formed along the outer circumference of the rotating ring 3 and external teeth formed along the outer circumference of each gear 9.

Furthermore, a mechanical fuse 11 can be coupled between the output shaft 5A of the motor 5 and each gear 9 included in the power transmission mechanism 6. The mechanical fuse 11 is a shaft which breaks when torque exceeds a certain value.

When the mechanical fuse 11 is coupled as a part of the output shaft 5A of the motor 5, the mechanical fuse 11 breaks according to the rise of torque even if the gear 9 stops rotating due to jamming. Therefore, when jamming has arisen, transmission of the power from the corresponding motor 5 to the gear 9 can be cut off promptly. Thereby, the redundancy and the safety of the rotating device 1 can be secured.

Figure 4:
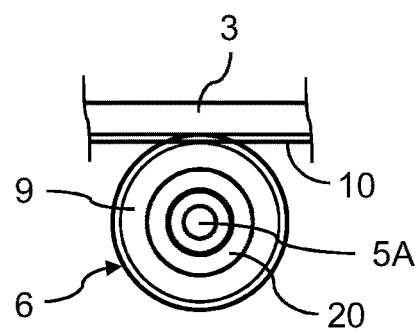
FIG. 4 shows an example of coupling the gear to the output shaft of the motor shown in FIG. 2 through a torque limiter.

FIG. 4 shows an example of coupling the gear 9 to the output shaft 5A of the motor 5 shown in FIG. 2 through a torque limiter 20.

As exemplified in FIG. 4, the torque limiter 20 may be coupled between the output shaft 5A of the motor 5 and each gear 9, instead of coupling the mechanical fuse 11 to the output shaft 5A of the motor 5. The torque limiter 20 is a clutch which cuts off transmission of torque when the torque exceeds a certain value. The torque limiter 20 is produced by adjusting torque necessary to slip a one way clutch, which transmits torque only in one way, and has structure in which an inner ring rotates relatively to an outer ring, similarly to a one way clutch.

When the torque limiter 20 is coupled to the output shaft 5A of the motor 5, transmission of torque is cut off according to rise in the torque even if the gear 9 stops rotating due to jamming. Therefore, when jamming has arisen, transmission of the power from the corresponding motor 5 to the gear 9 can be promptly cut off. Thereby, the redundancy and the safety of the rotating device 1 can be secured.

When not less than two gears 9 are prepared in order to rotate the rotating ring 3, each gear 9 may be disposed so that the gears 9 may become point symmetry with regard to the rotation center of the rotating ring 3. When not less than three gears 9 are disposed so that the gears 9 may become point symmetry with regard to the rotation center of the rotating ring 3, a position gap of the rotation center of the rotating ring 3 can be prevented so that concentricity of the rotation center and the coaxiality of the rotation axis of the rotating ring 3 can be improved. Even when not less than three gears 9 are disposed so that the gears 9 may not become point symmetry with regard to the rotation center of the rotating ring 3, a position gap in a radial direction of the rotating ring 3 can be prevented as long as the not less than three gears 9 are disposed so that at least one gear 9 may lie in each of both sides which sandwich the diameter at any position of the rotating ring 3.

When the motor 5 with large weight is placed at a high position in a case where the rotation axis of the rotating ring 3 is not in the vertical direction, the center of gravity of the rotating device 1 moves to a high position, and the stability of the rotating device 1 deteriorates. Accordingly, the motors 5 and the gears 9 may be placed so that the weight balance of the rotating device 1 may become satisfactory. For example, when the central axis of the rotating ring 3 is approximately horizontal, the motors 5 and the corresponding gears 9 may be placed below locally as exemplified in FIG. 1. This is the same when the number of the motors 5 is one.

When a local portion of the rotating ring 3 is engaged with the gear 9 or the gears 9, the rotating ring 3 may become unstable since a portion of the rotating ring 3 away from the gear 9 or the gears 9 are not be supported. Accordingly, the rotating ring 3 may be supported by the guide mechanism 7, as needed. The guide mechanism 7 is a support device which supports the rotating ring 3 rotatably. In the example shown in FIG. 1, the guide mechanism 7 has been fixed to the fixed ring 4.

The guide mechanism 7 can be composed of a guide having rollers rotatably supporting the rotating ring 3, for example. As a matter of course, the guide mechanism 7 may also be a non-contact-type device utilizing magnetic attraction or the like, instead of a contact-type device.

Figure 5:
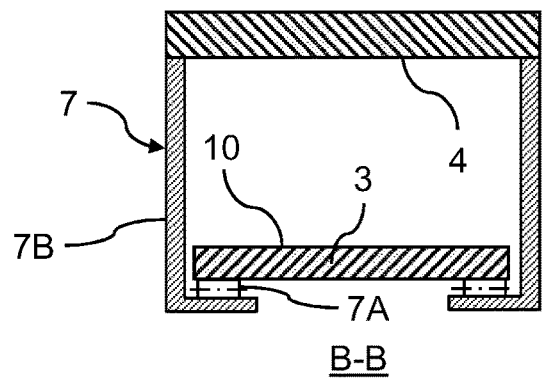
FIG. 5 is a partial expanded sectional view at the position B-B which shows a structural example of the guide mechanism shown in FIG. 1.

FIG. 5 is a partial expanded sectional view at the position B-B which shows a structural example of the guide mechanism 7 shown in FIG. 1.

As exemplified in FIG. 5, the guide mechanism 7 can have suspension structure in which at least one fixed roller 7A, rolling while contacting with the inner surface of the rotating ring 3, is attached to a frame 7B, for example. When the central axis of the rotating ring 3 is approximately horizontal, at least one guide mechanism 7 having such suspension structure can be placed at a desired position so that a vertically upper part of the rotating ring 3 can be supported.

On the other hand, as for a vertically lower part of the rotating ring 3, the weight of the rotating ring 3 can be supported by a pair of the plate-like gears 9 as exemplified in FIG. 2 or at least one cylindrical gear 9 long in the rotating axis direction. That is, when the angle between the central axis of the rotating ring 3 and the horizontal direction is within ±45 degrees, for example, like a case where the rotating device 1 is a ducted fan for an aircraft for obtaining thrust, an upper part of the rotating ring 3 can be supported at the inner surface having no teeth by the fixed roller 7A or the fixed rollers 7A of at least one guide mechanism 7 while a lower part of the rotating ring 3 can be supported at the outer surface having teeth by at least one gear 9.

Note that, the weight of the rotating ring 3 may be supposed only by the gears 9 placed at different positions in the rotation direction of the rotating ring 3 with no guide mechanism 7 when the concentricity required for the rotation center of the rotating ring 3 and the coaxiality required for the rotation axis of the rotating ring 3 are low in a case where the rotation axis of the rotating ring 3 is horizontal.

In a case where the central axis of the rotating ring 3 rotating the blades 2 is in the vertical direction or close to the vertical direction, such as a case where an angle between the central axis of the rotating ring 3 and the vertical direction is within ±45 degrees, one end face of the rotating ring 3 becomes a lower side. In that case, it is realistic to support one end face in the lower side of the rotating ring 3 by at least one guide mechanism 7. When the central axis of the rotating ring 3 is in the vertical direction or close to the vertical direction, not only each guide mechanism 7 but each gear 9 may be placed in the lower side of one end face of the rotating ring 3.

Figure 6:
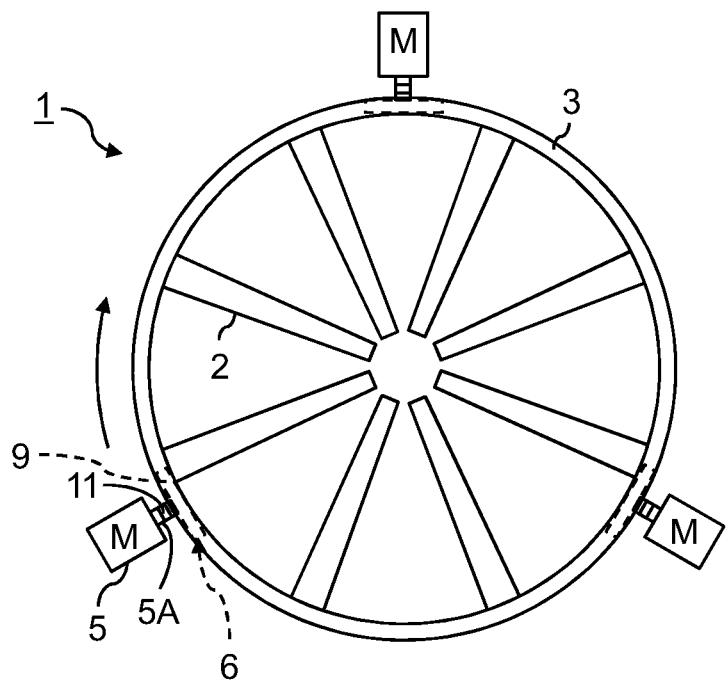
FIG. 6 is a front view of the rotating device showing an example of transmitting torque from the gears to an end face in the lower side of the rotating ring.

FIG. 6 is a front view of the rotating device 1 showing an example of transmitting torque from the gears 9 to an end face in the lower side of the rotating ring 3.

When the central axis of the rotating ring 3 is in the vertical direction or close to the vertical direction, torque can be transmitted to the end face in the lower side of the rotating ring 3 while supporting the weight of the rotating ring 3 using the gears 9 each consisting of a disk-shaped or cylindrical spur gear, as shown in FIG. 6. In this case, the gear 10 of the rotating ring 3 engaged with the gears 9 included in the power transmission mechanisms 6 is formed into a ring shape on the end face in the lower side of the rotating ring 3.

Meanwhile, the gear 9 included in each power transmission mechanism 6 is placed so that the rotating axis may be directed in a radial direction of the rotating ring 3. Then, the motors 5 to which the mechanical fuses 11 or the torque limiters 20 are coupled to the output shafts 5A respectively can be placed outside the rotating ring 3, and the output shafts 5A of the motors 5 can be coupled to the gears 9 respectively, similarly to an example shown in FIG. 2.

In addition, the weight of the rotating ring 3 may be supported by at least one guide mechanism 7 having desired structure, instead of supporting the weight of the rotating ring 3 only by the gears 9. When all or a part of the weight of the rotating ring 3 is supported by at least one guide mechanism 7, output torque required for each gear 9 to rotate the rotating ring 3 can be reduced. For example, the rotating ring 3 may be floated using a magnetic force so that the weight of the rotating ring 3 can be supported from the lower side.

Figure 7:
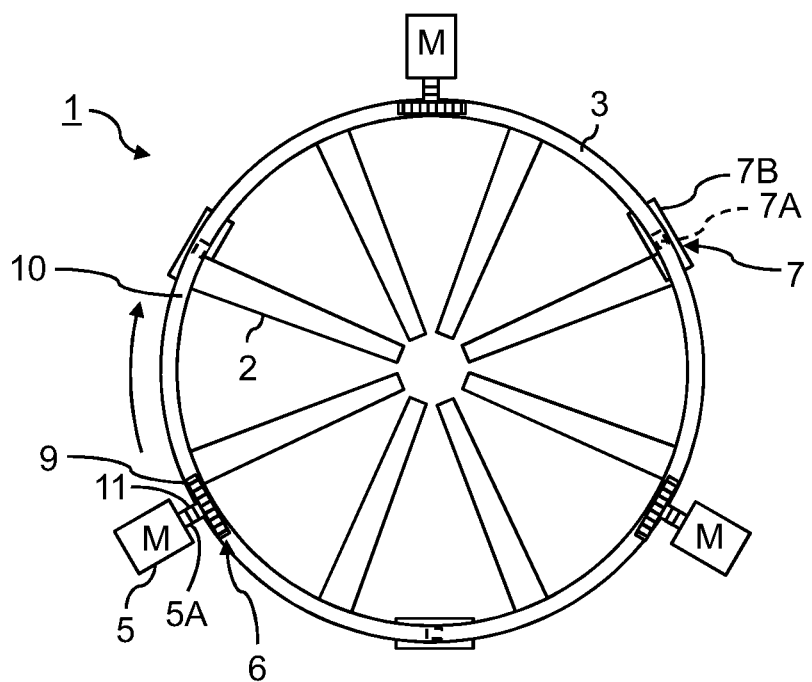
FIG. 7 is a front view of the rotating device showing an example of transmitting torque from the gears to an end face in the upper side of the rotating ring.
Figure 8:
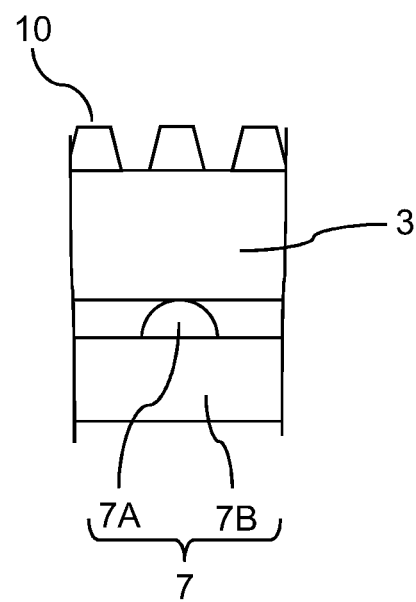
FIG. 8 is a partially expanded bottom view of the rotating device showing a structural example of the guide mechanism shown in FIG. 7.

FIG. 7 is a front view of the rotating device 1 showing an example of transmitting torque from the gears 9 to an end face in the upper side of the rotating ring 3, and FIG. 8 is a partially expanded bottom view of the rotating device 1 showing a structural example of the guide mechanism 7 shown in FIG. 7.

When the central axis of the rotating ring 3 is in the vertical direction or close to the vertical direction, the gear 10 may be formed into a ring shape on the end face in the upper side of the rotating ring 3. Meanwhile, a flat ring shaped face or a circle can be formed on the end face in the lower side of the rotating ring 3, without forming teeth having concavity and convexity.

In this case, the weight of the rotating ring 3 can be supported from the lower side by the guide mechanisms 7 each having structure in which a fixed roller 7A or fixed rollers 7A are supported by a frame 7B. Meanwhile, the gears 9 included in the power transmission mechanisms 6 respectively can be placed in the upper side of the rotating ring 3 so as to be engaged with the gear 10 formed on the end face in the upper side of the rotating ring 3. Note that, the number of the gears 9 composing the power transmission mechanisms 6 respectively may be one when the redundancy is not given.

In this case, the gears 10 have only to apply torque necessary only for rotation of the rotating ring 3 since the weight of the rotating ring 3 is supported from the lower side by the guide mechanisms 7. Accordingly, the power required for each motor 5 can be reduced.

Note that, also in a case where the central axis of the rotating ring 3 is in the vertical direction or close to the vertical direction, the gear 10 may be formed on the outer surface of the rotating ring 3 and the rotating axis of the gear 9 included in each power transmission mechanism 6 may be parallel to the rotating axis of the rotating ring 3, similarly to the example shown in FIG. 1 and FIG. 2, not only when the weight of the rotating ring 3 is supported from the lower side by the guide mechanisms 7, but also when the weight of the rotating ring 3 is supported from the upper side of the rotating ring 3 by the guide mechanisms 7 of suspension type or the like. On the contrary, in a case where the central axis of the rotating ring 3 is in the horizontal direction or close to the horizontal direction, at least one gear 9 may be placed so that the rotating axis may be directed in a radial direction of the rotating ring 3 when the weight of the rotating ring 3 is supported by at least one guide mechanism 7.

Although an example of a case where a spur gear was used as each gear 9 included in the power transmission mechanisms 6 was described in the above-mentioned examples, various kinds of gears can be used so that each motor 5 can be placed at a desired position according to a direction of the rotating ring 3 and an intended purpose of the rotating device 1. As a concrete example, a gear, such as a worm gear or a bevel gear, of which the output axis and transfer axis of torque are not the same direction, may be used as at least one gear 9 of the power transmission mechanism 6. As a worm gear which rotates a worm wheel with a worm, a hourglass worm gear and a cylindrical worm gear are typical.

Accordingly, the ring-shaped gear 10 can be formed on a corresponding surface of the rotating ring 3 according to arrangement and a kind of each gear 9 composing the power transmission mechanism 6 so that the gear 10 can be engaged with each gear 9. That is, the gear 10 may be formed on the outer surface of the rotating ring 3 so that torque may be transmitted from the gears 9 of the power transmission mechanisms 6 to the outer surface of the rotating ring 3 as exemplified in FIG. 1 and FIG. 2. Alternatively, the gear 10 may be formed on a lateral face of the cylindrical rotating ring 3 so that torque may be transmitted from the gears 9 of the power transmission mechanisms 6 to the lateral face of the rotating ring 3 as exemplified in FIG. 6 or FIG. 7.

The above-mentioned rotating device 1 having hubless structure can be used for various intended purposes as described above. For example, the rotating device 1 can be used as a fan for an aircraft.

Figure 9:
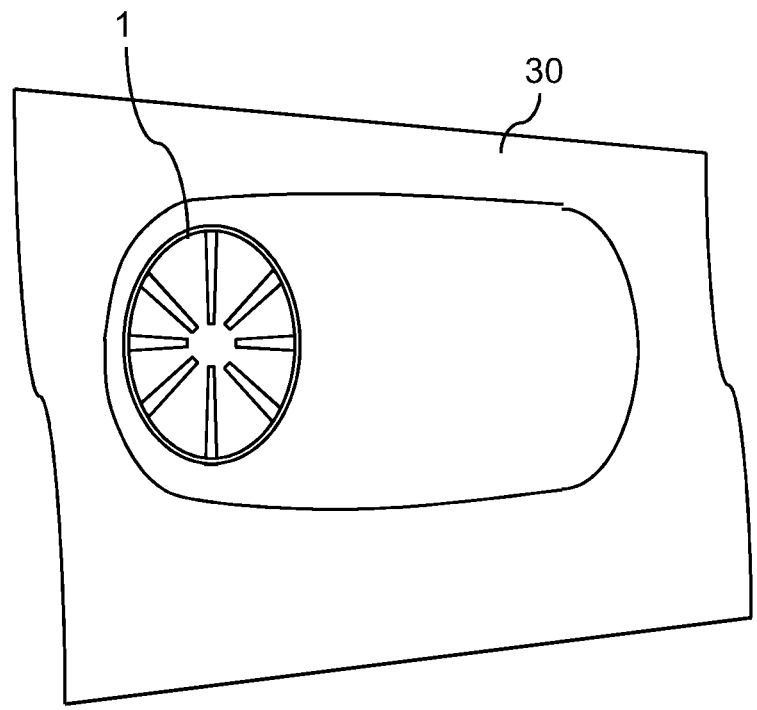
FIG. 9 shows the first example of an aircraft having the rotating devices shown in FIG. 1.
Figure 10:
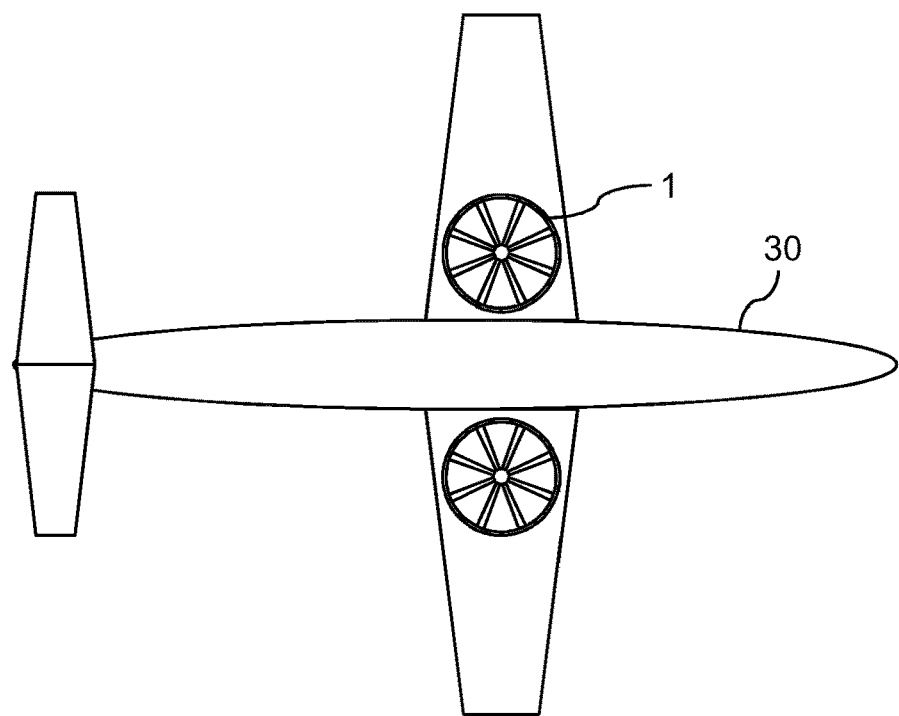
FIG. 10 shows the second example of an aircraft having the rotating devices shown in FIG. 1.
Figure 11:
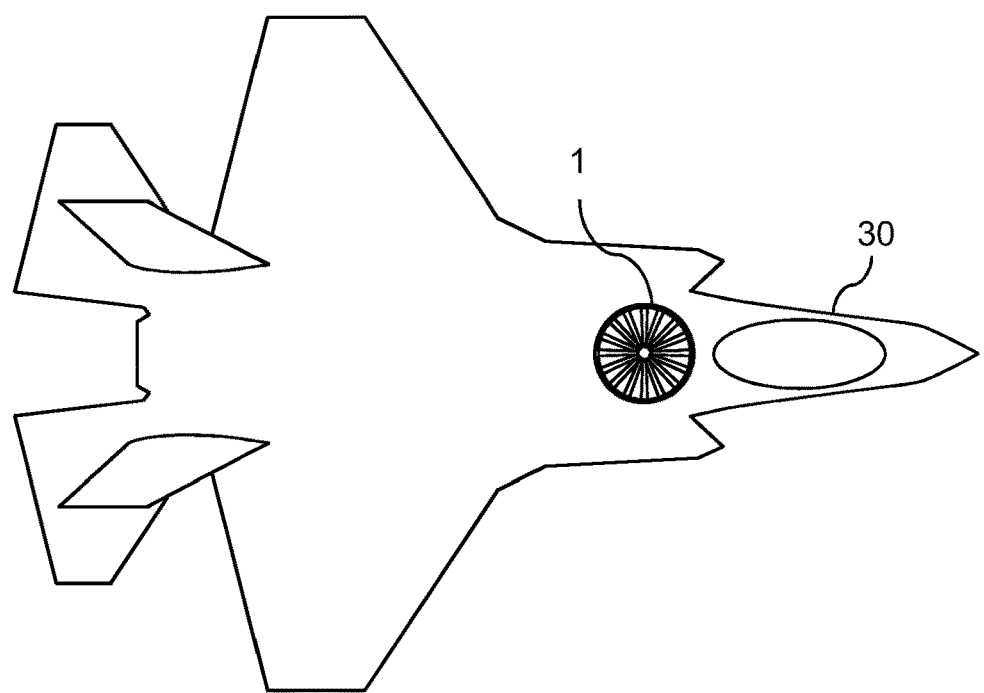
FIG. 11 shows the third example of an aircraft having the rotating device shown in FIG. 1.
Figure 12:
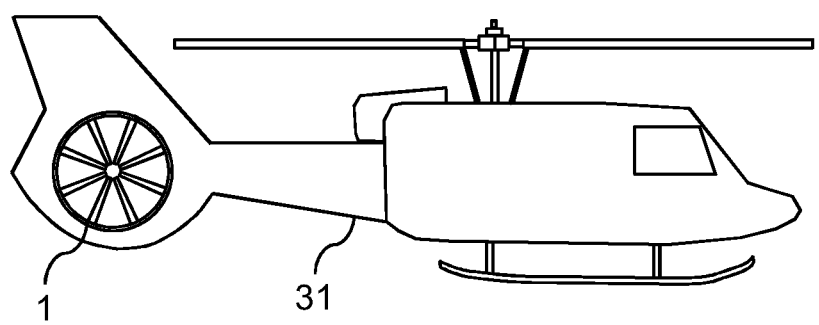
FIG. 12 shows the fourth example of an aircraft having the rotating device shown in FIG. 1.

FIG. 9 shows the first example of an aircraft having the rotating devices 1 shown in FIG. 1. FIG. 10 shows the second example of an aircraft having the rotating devices 1 shown in FIG. 1. FIG. 11 shows the third example of an aircraft having the rotating device 1 shown in FIG. 1. FIG. 12 shows the fourth example of an aircraft having the rotating device 1 shown in FIG. 1.

As shown in FIG. 9, the rotating device 1 having no hub can be used as a fan which composes a turbofan engine or the like attached to a fuselage, a main wing or the like of a fixed wing aircraft 30 in order to obtain thrust. Meanwhile, the rotating device 1 having no hub can be used as a lift fan attached to a main wing, a fuselage or the like of a fixed wing aircraft 30 as shown in FIG. 10 or FIG. 11. Alternatively, the rotating device 1 can also be used as a ducted fan which composes a tail rotor of a rotor craft 31 as shown in FIG. 12.

(Effects)

According to the rotating device 1, hydrodynamic efficiency can be improved since the rotating device 1 has no hub which has been disposed at the rotation center of the conventional rotating device. For example, the efficiency of generating thrust or lift can be improved, or the force of a generated wind can be increased.

Moreover, redundancy can be given to the rotating device 1 by rotating the rotating ring 3 by more than one motor 5 and adopting structure in which transmission of torque to the rotating ring 3 rotating the blades 2 is cut off when the torque applied on the output shaft 5A of the motor 5 exceeds an acceptable range. Thereby, the rotating device 1 can also be used as a fan for an aircraft requiring safety, reliability and redundancy in particular.

(Second Implementation)

Figure 13:
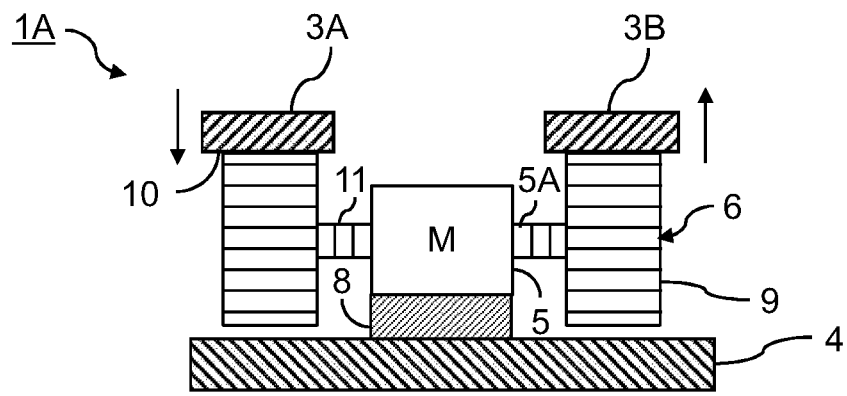
FIG. 13 is a partial sectional view showing a structure of a rotating device according to the second implementation of the present invention.
Figure 14:
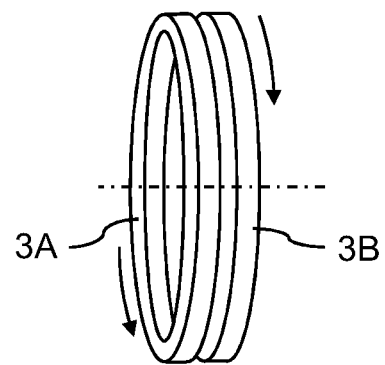
FIG. 14 is a perspective view showing a method of disposing two rotating rings shown in FIG. 13.

FIG. 13 is a partial sectional view showing a structure of a rotating device according to the second implementation of the present invention, and FIG. 14 is a perspective view showing a method of disposing two rotating rings shown in FIG. 13.

A rotating device 1A in the second implementation shown in FIG. 13 is different from the rotating device 1 in the first implementation in a point that the radially placed blades 2 are rotated by each of two rotating rings 3A and 3B placed at different positions in the rotating axis direction. Other configurations and actions of the rotating device 1A in the second implementation are not substantially different from those of the rotating device 1 in the first implementation. Therefore, only vicinity of the motor 5 and the gears 9, and arrangement of the rotating rings 3A and 3B are illustrated. Then, the same signs are attached to the same elements and the corresponding elements, and explanation thereof is omitted.

The rotating device 1A in the second implementation has the first rotating ring 3A and the second rotating ring 3B. The first rotating ring 3 and the second rotating ring 3B are placed at different positions in a common central axis direction so that the first rotating ring 3 and the second rotating ring 3B may rotate around the central axes which are on the same common straight line as shown in FIG. 14.

Each power transmission mechanism 6 is configured to rotate the first rotating ring 3A and the second rotating ring 3B in directions opposite to each other by transmitting torque, output from the motor 5, to each of the first rotating ring 3A and the second rotating ring 3B as shown in FIG. 13. For that purpose, the common motor 5 can have two output shafts 5A outputting torque in directions opposite to each other. Then, one output shaft 5A of the motor 5 can be coupled to the first rotating ring 3A through the gear 9 while the other output shaft 5A of the motor 5 can be coupled to the second rotating ring 3B through the gear 9.

As a matter of course, the first rotating ring 3A and the second rotating ring 3B may be rotated in directions opposite to each other with separate motors 5. Nevertheless, when the first rotating ring 3A and the second rotating ring 3B are rotated in directions opposite to each other with the common motor 5, it becomes easy to coincide the rotating speed of the first rotating ring 3A with that of the second rotating ring 3B, and to synchronize rotational movement of the first rotating ring 3A with that of the second rotating ring 3B.

Thus, when the first rotating ring 3 and the second rotating ring 3 to which the blades 2 for forming a flow of fluid are radially attached respectively are rotated in directions opposite to each other, the rotating device 1A can be functioned as contra-rotating propellers or contra-rotating fans. Therefore, wind force, thrust, lift or the like generated by the rotating device 1A can be made large.

When the rotating axes of the first rotating ring 3A and the second rotating ring 3B are in the vertical direction or close to the vertical direction, disposing a bearing between the first rotating ring 3A and the second rotating ring 3B allows rotating the first rotating ring 3A and the second rotating ring 3B in directions opposite to each other while supporting the weight of the rotating ring 3 in the upper side. Alternatively, the gears 9 may be disposed between the first rotating ring 3A and the second rotating ring 3B so that the rotating axis directions of the gears 9 may be radial directions of the first rotating ring 3A and the second rotating ring 3B, similarly to the examples shown in FIG. 6 and FIG. 7. As another example, a bearing may be disposed between the first rotating ring 3A and the second rotating ring 3B while separate gears 9 may be disposed in both sides of a contra-rotating ring unit, configured by coupling the first rotating ring 3A to the second rotating ring 3B with the bearing, so that the rotating axis directions of the separate gears 9 may be radial directions of the first rotating ring 3A and the second rotating ring 3B.

(Third Implementation)

Figure 15:
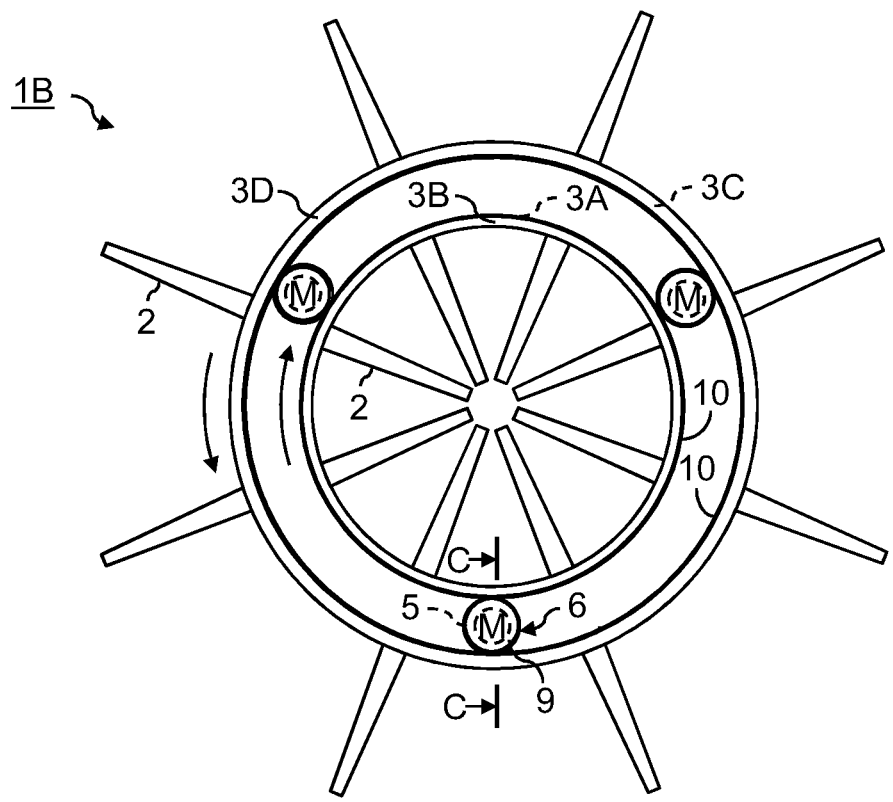
FIG. 15 is a front view showing a structure of a rotating device according to the third implementation of the present invention.
Figure 16:
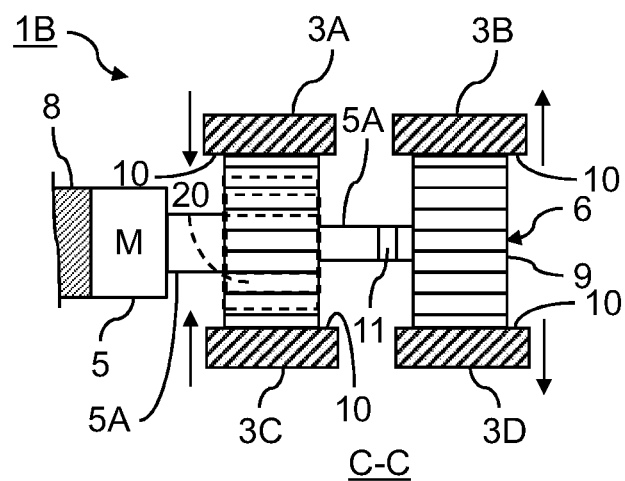
FIG. 16 is a partial expanded sectional view at the position C-C of the rotating device shown in FIG. 15.

FIG. 15 is a front view showing a structure of a rotating device according to the third implementation of the present invention, and FIG. 16 is a partial expanded sectional view at the position C-C of the rotating device shown in FIG. 15.

A rotating device 1B in the third implementation shown in FIG. 15 and FIG. 16 is different from the rotating device 1A in the second implementation in a point that the radially placed blades 2 are rotated by each of four rotating rings 3A, 3B, 3C and 3D placed at different positions in the rotating radial direction in addition to the rotating axis direction. Other configurations and actions of the rotating device 1B in the third implementation are not substantially different from those of the rotating device 1A in the second implementation. Therefore, the same elements and the corresponding elements are shown by the same signs, and their explanation is omitted.

The rotating rings 3 can also be placed at different positions not only in the rotating axis direction but in the rotating radial direction as shown in FIG. 15 and FIG. 16. In the example shown in FIG. 15 and FIG. 16, the rotating rings 3A, 3B, 3C and 3D have been placed at different positions in the rotating axis direction and in the rotating radial direction. Therefore, the number of the rotating rings 3A, 3B, 3C and 3D is four.

Specifically, the first rotating ring 3A and the second rotating ring 3B of which diameters are almost the same are placed at different positions in the rotating axis direction. Moreover, the first rotating ring 3A and the third rotating ring 3C of which diameters are different from each other are placed at different positions in the rotating radial direction so that the first rotating ring 3A may be inside while the third rotating ring 3C may be outside. Similarly, the second rotating ring 3B and the fourth rotating ring 3D of which diameters are different from each other are placed at different positions in the rotating radial direction so that the second rotating ring 3B may be inside while the fourth rotating ring 3D may be outside. Therefore, the inside diameter of the third rotating ring 3C is larger than the outside diameter of the first rotating ring 3A. Similarly, the inside diameter of the fourth rotating ring 3D is larger than the outside diameter of the second rotating ring 3B.

The blades 2 are radially attached on each of the inner surfaces of the inside first rotating ring 3A and second rotating ring 3B. Meanwhile, the blades 2 are radially attached to each of the outer surfaces of the outside third rotating ring 3C and fourth rotating ring 3D. Then, at least one motor 5 and gears 9 can be placed in an annular space formed between the inside first and second rotating rings 3A and 3B, and the outside third and fourth rotating rings 3C and 3D so that the gears 9 can transmit torque output from each motor 5 to each of the first rotating ring 3A, the second rotating ring 3B, the third rotating ring 3C and the fourth rotating ring 3.

Each power transmission mechanism 6 is configured to rotate the inside first rotating ring 3A and second rotating ring 3B, disposed in parallel in the rotating axis direction, in directions opposite to each other, similarly to the second implementation. Similarly, each power transmission mechanism 6 is configured to rotate the outside third rotating ring 3C and fourth rotating ring 3D, disposed in parallel in the rotating axis direction, in directions opposite to each other.

Furthermore, each power transmission mechanism 6 is configured to rotate the inside first rotating ring 3A and the outside third rotating ring 3C, disposed concentrically, in directions opposite to each other. Similarly, each power transmission mechanism 6 is configured to rotate the inside second rotating ring 3B and the outside fourth rotating ring 3D, disposed concentrically, in directions opposite to each other.

For that purpose, the gear 10 can be formed on each of the outer surface of the inside first rotating ring 3A and the inner surface of the outside third rotating ring 3C as exemplified in FIG. 16. Then, the gear 9 included in the power transmission mechanism 6 can be disposed so that the rotating axis of the gear 9 may be parallel to the rotating axes of the first rotating ring 3A and the third rotating ring 3C, and the gear 9 can be engaged with both of the gear 10 formed on the outer surface of the first rotating ring 3A and the gear 10 formed on the inner surface of the third rotating ring 3C.

Similarly, the gear 10 can be formed on each of the outer surface of the inside second rotating ring 3B and the inner surface of the outside fourth rotating ring 3D. Then, the gear 9 included in the power transmission mechanism 6 can be disposed so that the rotating axis of the gear 9 may be parallel to the rotating axes of the second rotating ring 3B and the fourth rotating ring 3D, and the gear 9 can be engaged with both of the gear 10 formed on the outer surface of the second rotating ring 3B and the gear 10 formed on the inner surface of the fourth rotating ring 3D.

In this case, the first rotating ring 3A and the third rotating ring 3C can be reversely rotated relatively by transmitting torque from the common gear 9 to the inside first rotating ring 3A and the outside third rotating ring 3C in directions opposite to each other. Similarly, the second rotating ring 3B and the fourth rotating ring 3D can be reversely rotated relatively by transmitting torque from the common gear 9 to the inside second rotating ring 3B and the outside fourth rotating ring 3D in directions opposite to each other.

Furthermore, a coaxial contra-rotating motor in which two output shafts 5A outputting torque in directions opposite to each other have been disposed coaxially can be used as each motor 5 as exemplified in FIG. 16. Then, it becomes possible to rotate the gear 9 for rotating the first rotating ring 3A and the third rotating ring 3C in opposite directions by transmitting torque in opposite directions, and the gear 9 for rotating the second rotating ring 3B and the fourth rotating ring 3D in opposite directions by transmitting torque in opposite directions, with the common motor 5.

Also in a case of using a coaxial contra-rotating motor, at least one of the mechanical fuse 11 and the torque limiter 20 can be coupled to the output shafts 5A of the motor 5 in order to secure redundancy. In the example shown in FIG. 16, the gear 9 for rotating the first rotating ring 3A and the third rotating ring 3C is coupled to the outside cylindrical output shaft 5A of the motor 5 through the torque limiter 20. Meanwhile, the mechanical fuse 11 is included in the inside round bar-shaped output shaft 5A of the motor 5, coupled to the gear 9 for rotating the second rotating ring 3B and the fourth rotating ring 3D.

Therefore, even when one of the two gears 9 rotated by the common motor 5 stops due to jamming, the other gear 9 can be rotated. As a matter of course, the torque limiter 20 may be used instead of the mechanical fuse 11, and conversely, the mechanical fuse 11 may be used instead of the torque limiter 20.

Note that, although the motor 5 having two round bar-shaped output shafts 5A in both sides may be used as exemplified in FIG. 13, using the motor 5 having the columnar output shaft 5A inside the cylindrical output shaft 5A as exemplified in FIG. 16 makes it possible to dispose the support member 8, for supporting the motor 5, at such a position that the support member 8 does not interfere with the path of fluid as much as possible.

As described above, a set of the first rotating ring 3A and the second rotating ring 3B, and a set of the third rotating ring 3C and the fourth rotating ring 3D can be rotated in directions opposite to each other by transmitting the torque output from the motor 5 or the motors 5 to each of the outer surfaces of the inside first rotating ring 3A and second rotating ring 3B and the inner surfaces of the outside third rotating ring 3C and fourth rotating ring 3D, with at least one power transmission mechanism 6 composed of the gears 9.

Therefore, the rotating device 1B can be made to function as not only contra-rotating propellers or contra-rotating fans of which two sets of the blades 2 radially disposed at different positions in the rotating axis direction are rotated in directions opposite to each other, but also contra-rotating propellers or contra-rotating fans of which two sets of the blades 2 radially disposed at different positions in the rotating radial direction are rotated in directions opposite to each other.

Note that, similarly to the examples shown in FIG. 6 and FIG. 7, the gears 9 may be disposed so that the rotating axes may be in the rotating radial directions of the rotating rings 3A, 3B, 3C and 3D, and torque of each gear 9 can be transmitted to the end faces of the rotating rings 3A, 3B, 3C and 3D. In that case, at least one gear 9 may be disposed between the first rotating ring 3A and the second rotating ring 3B, and between the third rotating ring 3C and the fourth rotating ring 3D so that each rotating axis may be in the rotating radial direction of the rotating rings 3A, 3B, 3C and 3D. Alternatively, a contra-rotating ring unit may be composed by coupling bearings between the first rotating ring 3A and the second rotating ring 3B, and between the third rotating ring 3C and the fourth rotating ring 3D respectively, and the separate gears 9 may be disposed in both sides of the contra-rotating ring unit so that the rotating axes may be in the rotating radial directions of the rotating rings 3A, 3B, 3C and 3D.

Moreover, at least one of the four rotating rings 3A, 3B, 3C and 3D may be omitted depending on an intended purpose of the rotating device 1B. For example, the rotating device 1B may be composed of only the outside third rotating ring 3C and fourth rotating ring 3D by omitting the inside first rotating ring 3A and second rotating ring 3B. In other words, in the second implementation, the blades 2 may be attached to the outer surfaces of the two rotating rings 3. Alternatively, the rotating device 1B may be composed of only the inside first rotating ring 3A and the outside third rotating ring 3C by omitting the inside second rotating ring 3B and the outside fourth rotating ring 3D.

As another modification, the inside first rotating ring 3A and the outside third rotating ring 3C may be rotated in the same direction. Similarly, the inside second rotating ring 3B and the outside fourth rotating ring 3D may be rotated in the same direction. That is, the rotating rings 3 disposed at different positions in the rotating axis direction may be reversely rotated relatively to each other while the rotating rings 3 disposed at different positions in the rotating radial direction may be rotated in the same direction.

Figure 17:
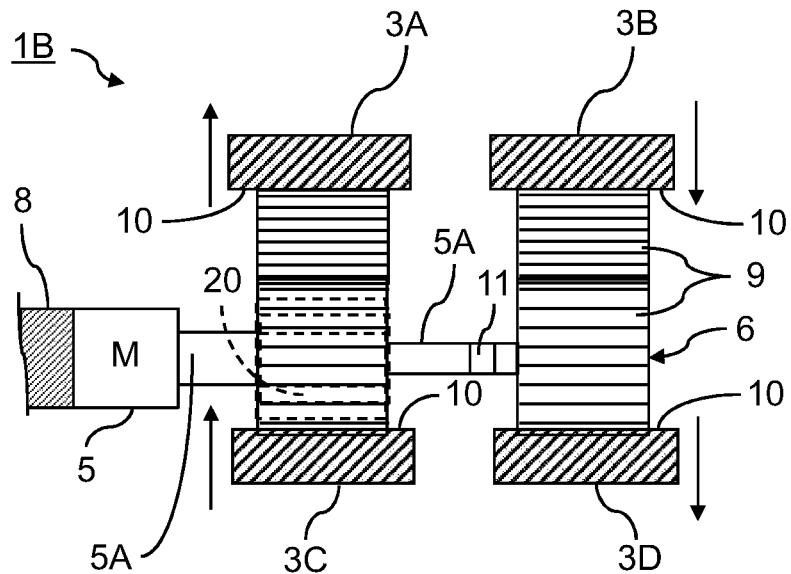
FIG. 17 shows a structural example of the motor and the gears in a case of rotating, in the same direction, the rotating rings disposed at positions different from each other in the rotating radial direction, out of the rotating rings shown in FIG. 15.

FIG. 17 shows a structural example of the motor 5 and the gears 9 in a case of rotating, in the same direction, the rotating rings 3 disposed at positions different from each other in the rotating radial direction, out of the rotating rings 3A, 3B, 3C and 3D shown in FIG. 15. Note that, FIG. 17 is a partial expanded sectional view at the position corresponding to the position C-C of FIG. 15.

As shown in FIG. 17, disk-shaped or cylindrical additional gears 9, consisting of external gears respectively engaged with the gears 9 whose rotating axes are on the straight line passing through the output shaft 5A of the motor 5, can be disposed. Thereby, the inside first rotating ring 3A and the outside third rotating ring 3C can be rotated in the same direction while the inside second rotating ring 3B and the outside fourth rotating ring 3D can be rotated in the same direction. The two gears 9 whose rotating axes are not on the straight line passing through the output shaft 5A of the motor 5 can be attached to a desired common structural object with contra-rotating shafts composed of a cylindrical rotating shaft and a bar-shaped rotating shaft inserted inside the cylindrical rotating shaft. Alternatively, the two gears 9 whose rotating axes are not on the straight line passing through the output shaft 5A of the motor 5 may be attached to desired separated structural objects respectively by disposing two simple bar-shaped rotating shafts on the same straight line outward so that they may not interfere with each other.

In particular, when the radii of the two gears 9 engaged with each other are made different from each other, it becomes possible to rotate the inside first rotating ring 3A and the outside third rotating ring 3C in the same direction with rotating speeds different from each other. Similarly, it also becomes possible to rotate the inside second rotating ring 3B and the outside fourth rotating ring 3D in the same direction with rotating speeds different from each other. That is, each of the rotating rings 3A, 3B, 3C and 3D can be rotated at a rotating speed corresponding to a gear ratio of the two gears 9 engaged with each other. In the example shown in FIG. 17, the sizes of the gears 9 have been determined so that the rotating speeds of the inside first rotating ring 3A and the inside second rotating ring 3B whose diameters are relatively small may be respectively larger than the rotating speeds of the outside third rotating ring 3C and the outside fourth rotating ring 3D whose diameters are relatively large.

Alternatively, separately to the motor 5 and the gears 9 for rotating the inside first rotating ring 3A and the inside second rotating ring 3B, another motor 5 and other gears 9 for rotating the outside third rotating ring 3C and the outside fourth rotating ring 3D may be prepared independently. In that case, the rotating speeds of the rotating rings 3A, 3B, 3C and 3D can be variably adjusted by controlling the motors 5.

Besides various variations as mentioned above, the rotating device 1B may be composed of a single rotating ring 3 having the blades 2 disposed radially on the outer surface. In other words, in the first implementation, the blades 2 may be attached to the outer surface of the rotating ring 3. When the rotating device 1B is composed of only at least one rotating ring 3 having the blades 2 disposed on the outer surface, a fixed ring may be disposed as a support member for fixing the motors 5 or the like with the inside of the rotating ring 3.

As described above, the blades 2 can be radially attached to at least one of the outer surface and the inner surface of at least one rotating ring 3, and power from at least one motor 5 can be transmitted to at least one of the outer surface, the inner surface and the side surfaces of the rotating ring 3 with at least one power transmission mechanism 6 having at least one gear 9. Moreover, when two or more rotating rings 3 are placed, the rotating rings 3 can be disposed at different positions in at least one direction of the central axis direction of the rotating rings 3 and the radial direction of the rotating rings 3. Then, a rotating device having such a hubless structure can be used for various intended purposes.

(Fourth Implementation)

Figure 18:
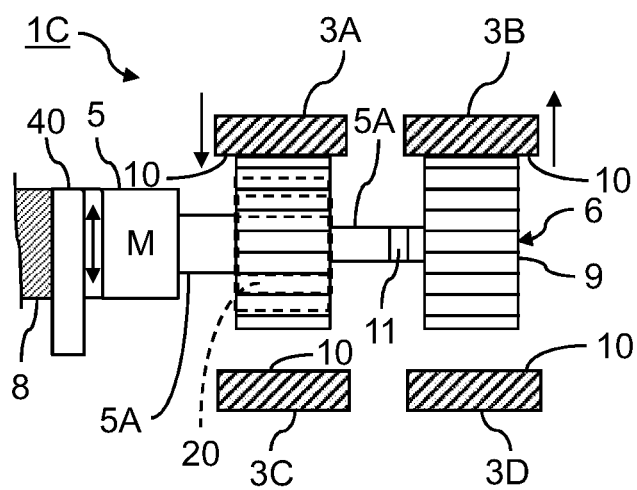
FIG. 18 is a partial sectional view showing a structure of a rotating device according to the fourth implementation of the present invention.

FIG. 18 is a partial sectional view showing a structure of a rotating device according to the fourth implementation of the present invention.

The rotating device 1C in the fourth implementation shown in FIG. 18 is different from the rotating device 1B in the third implementation in a point that at least one clutch mechanism 40 which switches transmission and cutoff of power output from the motor 5 to at least one rotating ring 3 is included. Other configurations and actions of the rotating device 1C in the fourth implementation are not substantially different from those of the rotating device 1B in the third implementation. Therefore, only the vicinity of the motor 5 and the gears 9 is illustrated. Then, the same signs are attached to the same elements and the corresponding elements, and explanation thereof is omitted.

The rotating device 1C in the fourth implementation has at least one clutch mechanisms 40. Each clutch mechanism 40 is a device which switches transmission and cutoff of power output from the motor 5 to at least one of the rotating rings 3A, 3B, 3C and 3D. Each clutch mechanism 40 can be composed of a slide mechanism, such as a linear guide, which moves the motor 5 and the gears 9 in parallel in the rotating radial direction of the rotating rings 3A, 3B, 3C and 3D as shown in FIG. 18.

On the other hand, the distance between the gears 10 formed on the outer surfaces of the inside first and second rotating rings 3A and 3B, and the gears 10 formed on the inner surfaces of the outside third and fourth rotating rings 3C and 3D can be made a distance obtained by adding a parallel moving amount of the motor 5 and the gears 9 by the clutch mechanism 40 with the diameter of the gears 9 for rotating the rotating rings 3A, 3B, 3C and 3D.

In other words, the distance between the gears 10 formed on the outer surfaces of the inside first and second rotating rings 3A and 3B, and the gears 10 formed on the inner surfaces of the outside third and fourth rotating rings 3C and 3D can be made longer than the diameter of the gears 9 for rotating the rotating rings 3A, 3B, 3C and 3D so that the gears 9 can be moved in parallel in the rotating radial direction of the rotating rings 3A, 3B, 3C and 3D by the clutch mechanism 40.

Then, the gears 9 can be engaged with either the gears 10 formed on the outer surfaces of the inside first and second rotating rings 3A and 3B or the gears 10 formed on the inner surfaces of the outside third and fourth rotating rings 3C and 3D, by operation of the clutch mechanism 40. Thereby, the transmission and cutoff of torque between the gears 9 and the rotating rings 3A, 3B, 3C and 3D can be switched so that either a pair of the inside first and second rotating rings 3A and 3B or a pair of the outside third and fourth rotating rings 3C and 3D can be driven and rotated. That is, the rotating rings 3 to be rotated can be switched between the inside first and second rotating rings 3A and 3B, and the outside third and fourth rotating rings 3C and 3D.

As a matter of course, the clutch mechanism 40 may also be configured to switch rotation and stop of the rotating rings 3A, 3B, 3C and 3D individually. Therefore, the clutch mechanism 40 can be included in the rotating device 1C regardless of the number of the rotating rings 3.

(Fifth Implementation)

Figure 19:
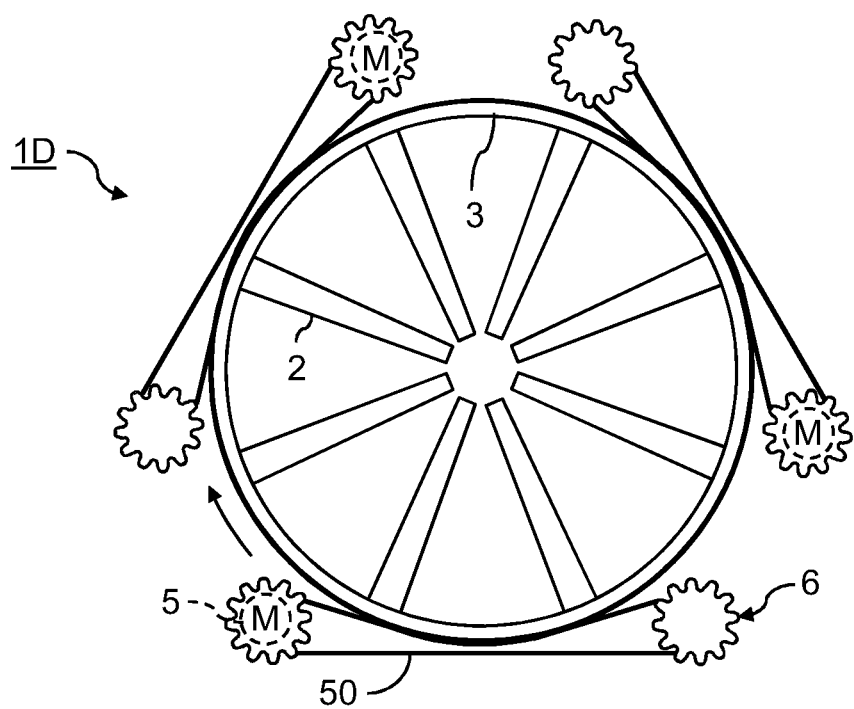
FIG. 19 is a front view showing a structure of a rotating device according to the fifth implementation of the present invention.

FIG. 19 is a front view showing a structure of a rotating device according to the fifth implementation of the present invention.

A rotating device 1D in the fifth implementation shown in FIG. 19 is different from the rotating device 1 in the first implementation in a point that at least one crawler 50 is included in the power transmission mechanism 6. Other configurations and actions of the rotating device 1D in the fifth implementation does not substantially differ from those of the rotating device 1 in the first implementation. Therefore, the same signs are attached to the same elements and the corresponding elements, and explanation thereof is omitted.

The crawler 50 may be used as the power transmission mechanism 6 which transmits power output from the motor 5 to the rotating ring 3, as well as the gear 9 as explained in the above-mentioned other implementations. Specifically, at least one crawler 50 can be disposed so as to contact with the outer surface of the rotating ring 3. Thereby, torque output from the motor 5 can be transmitted to the outer surface of the rotating ring 3 by the crawler 50.

Typical examples of the crawler 50 include a power transmission belt moving by frictional forces with rollers and a chain moving by rotation of sprockets. Also, when the crawler 50 is used, redundancy can be obtained by rotating the common rotating ring 3 with a plurality of the crawlers 50 as exemplified in FIG. 19.

As a matter of course, at least one rotating ring 3 may be rotated using both the gear 9 and the crawler 50. That is, the power transmission mechanism 6 can be composed of at least one of the gear 9 engaged with the gear 10 formed on the rotating ring 3 and the crawler 50 contacting with the rotating ring 3.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although some cases where the rotating devices 1, 1A, 1B, 1C and 1D are fans, rotors or the like, each rotating the blades 2, have been explained in the above-mentioned implementations, a rotating device having no blades 2 may be composed of at least one rotating ring 3. As a concrete example, a rotating device having no rotation shaft can be used as a tire wheel for an automobile. That is, the rotating ring 3 having no hub and no spokes can be used as a rim, and a tire for an automobile can be fixed to the outside of the rotating ring 3.

What is claimed is:

1. A rotating device comprising:
   at least one ring configured to rotate in a circumference direction, the at least one ring including no hub for housing a motor inside the at least one ring;
   at least one motor configured to generate power for rotating the at least one ring; and
   a power transmission mechanism configured to transmit the power to the at least one ring, the power transmission mechanism including a gear,
   wherein the at least one ring includes:
      a first ring rotating around a first central axis, the first ring being disposed at a first position; and
      a second ring rotating around a second central axis, the second ring being disposed at a second position different from the first position, the first central axis and the second central axis lying on a same straight line,
   wherein a first diameter of the first ring is different from a second diameter of the second ring,
   the first position is different from the second position in a rotating radial direction,
   the first ring is disposed inside the second ring,
   the at least one motor is disposed in an annular space formed between the first ring and the second ring, and
   the power transmission mechanism transmits torque, output from the at least one motor, to each of the first ring and the second ring so that, by the torque, the first ring and the second ring rotate in directions opposite to each other or in a same direction at rotating speeds different from each other.

2. The rotating device according to claim 1, further comprising:
   blades for forming a flow of a fluid, the blades being radially attached to at least one of an outer surface and an inner surface of the at least one ring.

3. The rotating device according to claim 1, further comprising:

at least one of a shaft and a torque limiter, which is coupled between an output shaft of the at least one motor and the power transmission mechanism, the shaft being broken when torque applied to the shaft exceeds a certain value.

4. The rotating device according to claim 1,
wherein the first position is different from the second position in a direction of the first and second central axes, and
the power transmission mechanism is configured to transmit torque, output from the at least one motor, to each of the first ring and the second ring so that, by the torque, the first ring and the second ring rotate in directions opposite to each other.

5. The rotating device according to claim 4, further comprising:
blades configured to form a flow of a fluid, the blades being radially attached to each of the first ring and the second ring rotating in the opposite directions.

6. The rotating device according to claim 1,
wherein the gear is configured to transmit torque, output from the at least one motor, to the at least one ring, the gear being engaged with teeth formed on the at least one ring.

7. The rotating device according to claim 1, further comprising:
a clutch configured to switch between transmission and cutoff of the power to the at least one ring.

8. An aircraft comprising:
the rotating device according to claim 1.

9. The rotating device according to claim 2, further comprising:
at least one of a shaft and a torque limiter, which is coupled between an output shaft of the at least one motor and the power transmission mechanism, the shaft being broken when torque applied to the shaft exceeds a certain value.

10. An aircraft comprising:
the rotating device according to claim 2.

11. A rotating device comprising:
a first ring configured to rotate in a first circumference direction around a first axis, no hub housing a motor being disposed inside the at least one ring;
a second ring configured to rotate in a second circumference direction around a second axis, an inside diameter of the second ring being larger than an outside diameter of the first ring, the first axis and the second axis lying on a same straight line, the second ring being disposed so that at least a part of the second ring is overlapped with the first ring as viewed from a first direction orthogonal to the second axis;
at least one motor configured to generate power for rotating the first ring and the second ring, the at least one motor being disposed so that a whole of the at least one motor falls between the first ring and the second ring as viewed from a second direction parallel to the first axis; and
a power transmission mechanism, having at least one gear, configured to transmit the power to the first ring and the second ring so that, by the power, the first ring and the second ring rotate in directions opposite to each other or in a same direction at rotating speeds different from each other,
wherein the at least one gear is coupled to an output shaft of the at least one motor and disposed in an annular space formed between the first ring and the second ring.

12. A rotating device comprising:
a first ring configured to rotate in a first circumference direction around a first axis, no hub housing a motor being disposed inside the at least one ring;
a second ring configured to rotate in a second circumference direction around a second axis, an inside diameter of the second ring being larger than an outside diameter of the first ring, the first axis and the second axis lying on a same straight line, the second ring being disposed so that at least a part of the second ring is overlapped with the first ring as viewed from a first direction orthogonal to the second axis;
at least one motor configured to generate power for rotating the first ring and the second ring, the at least one motor having an output shaft rotating around a third axis parallel to the first axis, the output shaft being disposed between the first ring and the second ring as viewed from a third direction parallel to the third axis; and
a power transmission mechanism, having at least one gear, configured to transmit the power to the first ring and the second ring so that, by the power, the first ring and the second ring rotate in directions opposite to each other or in a same direction at rotating speeds different from each other,
wherein the at least one gear is coupled to the output shaft of the at least one motor and disposed in an annular space formed between the first ring and the second ring.

* * * * *